United States Patent Office 2,748,115
Patented May 29, 1956

2,748,115

UN-IONIZED CYANINE DYES

Leslie G. S. Brooker and Earl J. Van Lare, Rochester, N. Y., assignors to Eastman Kodak Company, Rochester, N. Y., a corporation of New Jersey No Drawing. Application September 8, 1954, Serial No. 454,846

11 Claims. (Cl. 260—240.6)

This invention relates to un-ionized cyanine dyes which are useful in optically sensitizing photographic silver halide emulsions and a method of making them.

Cyanine dyes are usually ionized compounds, the dye cation being "neutralized" by an acidic anion, such as chloride, iodide, p-toluenesulfonate, etc. The dyes known as merocyanines, on the other hand, are un-ionized compounds, though in them polarity is developed through polarization of the amidic system which is the characteristic system of dyes of this class. (See Brooker et al. "Jour. Am. Chem. Soc.," vol. 73 (1951), pg. 5332 et seq.).

The dyes of the present invention are similar to merocyanines in that they are un-ionized, yet they differ in certain fundamental respects both from the ordinary ionized cyanines and from the merocyanines.

The dyes of our invention can advantageously be represented by the following general formula:

I.

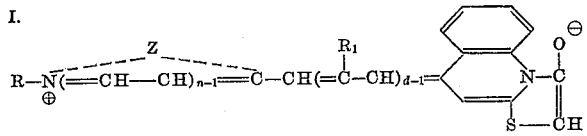

wherein R represents an alkyl group, such as methyl, ethyl, n-propyl, n-butyl, β-hydroxyethyl, β-methoxyethyl, carbethoxymethyl, banzyl (phenylmethyl), etc. (e. g., an alkyl group of the formula $C_mH_{2m+1}$ wherein $m$ represents a positive integer of from 1 to 4), $R_1$ represents a hydrogen atom, an alkyl group (e. g., methyl, ethyl, propyl, butyl, etc.) or an aryl group, such as phenyl, o-, m-, and p-tolyl, etc., (e. g., a mononuclear aromatic group of the benzene series), $d$ and $n$ each represents a positive integer of from 1 to 2, and Z represents the non-metallic atoms necessary to complete a heterocyclic nucleus containing from five ($n$ is 1) to six ($n$ is 2) atoms in the heterocyclic ring, such as those selected from the group consisting of those of the thiazole series (e. g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), those of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g., naphtho[1,2]thiazole, naphtho[2,1]thiazole, 5-methoxynaphtho[2,1]thiazole, 5-ethoxynaphtha[2,1]-thiazole, 8-methoxynaphtho[1,2]thiazole, 7-methoxynaphtho[1,2]thiazole, etc.), those of the thianaphtheno-7',6',-4,5-thiazole series (e. g., 4'-methoxythianaphtheno-7',6',-4,5-thiazole, etc.), those of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g., benzooxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g., naphtho[1,2]oxazole, naphtho[2,1] oxazole, etc.), those of the selenazole series (e. g., 4-methylselenazole, 4-phenylselenazole, etc.), those of the benzoselenazole series (e. g., benzoselenazole, 5-chlorobenzoselenazole, 5-methoxybenzoselenazole, 5-hydroxybenzoselenazole, tetrahydrobenzoselenazole, etc.), those of the naphthoselenazole series (e. g., naphtho[1,2]selenazole, naphtho[2,1]selenazole, etc.), those of the thiazoline series (e. g., thiazoline, 4-methylthiazoline, etc.), those of the 2-quinoline series (e. g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g., quinoline, 6-methoxyquinoline, 7-methylquinoline, 8-methylquinoline, etc.), those of the 1-isoquinoline series (e. g., isoquinoline, 3,4-dihydroisoquinoline, etc.), those of the 3-isoquinoline series (e. g., isoquinoline, etc.), those of the benzimidazole series (e. g., 1,3-diethylbenzimidazole, 1-ethyl-3-phenylbenzimidazole, etc.), those of the 3,3-dialkylindolenine series (e. g., 3,3-dimethylindolenine, 3,3,5-trimethylindolenine, 3,3,7-trimethylindolenine, etc.), those of the 2-pyridine series (e. g., pyridine, 5-methylpyridine, etc.), those of the 4-pyridine series (e. g., pyridine, etc.), etc.

It is, therefore, an object of our invention to provide new cyanine dyes. Another object is to provide methods for making these new dyes. Still another object is to provide photographic silver halide emulsions sensitized with our new dyes. Other objects will become apparent from a consideration of the following description and examples.

The simple cyanine dyes ($d$ is 1) selected from those represented by Formula I can advantageously be prepared by condensing an intermediate selected from those represented by the following general formula:

II.

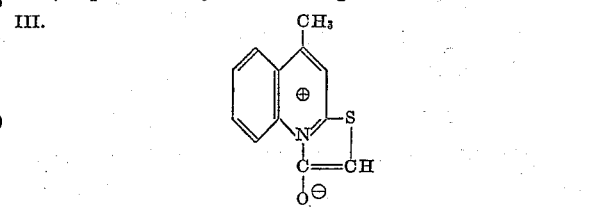

wherein R, $n$ and Z each have the values given above, $R_2$ represents an alkyl (e. g., methyl, ethyl, etc.) or aryl (e. g., phenyl, o-, m-, and p-tolyl, etc.) group and X represents an acid radical, such as chloride, bromide, iodide, benzenesulfonate, p-toluenesulfonate, etc., together with anhydro-1-hydroxy - 5 - methylthiazolo[3,2-a]quinolinium hydroxide (Duffin et al., "Jour. Chem. Soc.," 1951, pg. 734) represented by the following formula:

III.

The carbocyanine dyes ($d$ is 2) selected from those represented by Formula I wherein $R_1$ is a hydrogen atom can advantageously be prepared by condensing a compound selected from those represented by the following general formula:

IV.

$$R-N(=CH-CH)_{n-1}=C-CH=CH-N-R_3$$
$$\phantom{R-N(=CH-CH)_{n-1}=}X \phantom{=CH=CH-N-}R_4$$

wherein R, X, Z, and n each have the values given above, R₃ represents an acyl group of a carboxylic acid (e. g., acetyl, propionyl, butyryl, benzoyl, etc.), and R₄ represents an aryl group (e. g., phenyl, o-, m-, and p-tolyl, etc.) together with the compound represented by Formula III above.

The carbocyanine dyes (d is 2) selected from those represented by Formula I wherein R₁ is an alkyl or aryl group can advantageously be prepared by condensing a compound selected from those represented by the following general formula:

V.

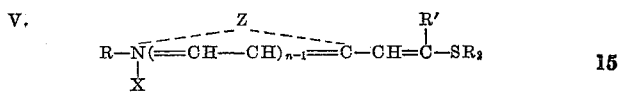

wherein R, R₂, X, Z, and n each have the values given above, and R' represents an alkyl or aryl group as defined by R₁ above, together with the compound represented by Formula III above. Intermediates selected from those represented by Formula V above can advantageously be prepared as described in Brooker and Keyes U. S. Patent 2,315,498, issued April 6, 1943, or British Patent 412,309, accepted June 28, 1934.

The condensation of the compound represented by Formula III with a compound selected from those represented by Formulas II, IV or V above can advantageously be accelerated by heating. Temperatures varying from ambient temperature (ca. 25° C.) to the reflux temperature of the reaction mixture can be employed.

The condensation of the compound represented by Formula III with a compound selected from those represented by Formulas II, IV or V above can advantageously be carried out in the presence of an inert diluent, such as the lower aliphatic alcohols (e. g., ethanol, propanol, isopropanol, butanol, isobutanol, etc.), pyridine, 1,4-dioxane, quinoline, etc. Basic condensing agents, such as the trialkylamines (e. g., triethylamine, tripropylamine, triisopropylamine, tributylamine, triisobutylamine, etc.), the N,N-dialkylanilines (e. g., N,N-dimethylaniline, N,N-diethylaniline, etc.), the N-alkylpiperidines (e. g., N-methylpiperidine, N-ethylpiperidine, etc.), etc. can be advantageously employed to accelerate these condensations. Alkali metal hydroxides (e. g., potassium hydroxide, sodium hydroxide, etc.), when employed in alcoholic solution, have been found to be particularly useful condensing agents for the condensation of the compound of Formula III with those of Formula V.

The following examples will serve to illustrate more fully the manner in which we practice our invention.

EXAMPLE 1

*Anhydro-3-ethyl-1'-hydroxyoxa-5'-(thiazolo[3,2-a]-quino)carbocyanine hydroxide*

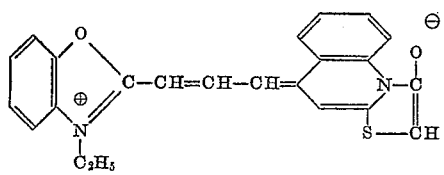

Anhydro-1-hydroxy-5-methylthiazolo[3,2-a]quinolinium hydroxide (1.08 g., 1 mol.), 2-β-acetanilidovinylbenzoxazole ethiodide (2.2 g., 1 mol.), pyridine (10 ml.) and triethylamine (0.5 g., 1 mol.) were refluxed together for 10 minutes. The reaction mixture was cooled, the crude dye precipitated with ether, the ether layer decanted off and the residue stirred with ethyl alcohol. After filtration, a 60% yield of crude dye was obtained. It was purified by dissolving in pyridine and precipitating with methyl alcohol. The pure dye was obtained as green crystals in a 32% yield, M. P. 238–240° C. dec.

*Anal.*—Calcd. for $C_{23}H_{18}N_2O_2S+\frac{1}{2}$ mol. $CH_3OH$: C, 70.2; H, 4.9. Found: C, 70.1; H, 5.1.

EXAMPLE 2

*Anhydro-3-ethyl-1'-hydroxythia-5'-(thiazolo[3,2-a]-quino)carbocyanine hydroxide*

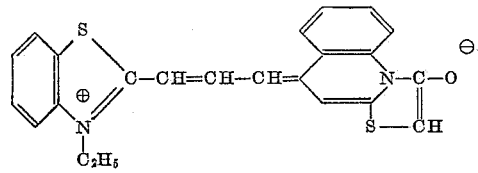

Anhydro-1-hydroxy-5-methylthiazolo[3,2-a]quinolinium hydroxide (1.08 g., 1 mol.), 2-β-acetanilidovinylbenzothiazole ethiodide (2.25 g., 1 mol.), pyridine (10 ml.) and triethylamine (0.5 g., 1 mol.) were refluxed together for 10 minutes. The reaction mixture was cooled, the crude dye precipitated with ether, the ether layer decanted off and the residue stirred with methyl alcohol. After cooling and filtering, a 75% yield of crude dye was obtained. The dye was purified by dissolving in pyridine and precipitating with methyl alcohol. The pure dye was obtained as dark green crystals in a 40% yield, M. P. 244–245° C. dec.

*Anal.*—Calcd. for $C_{23}H_{18}N_2OS_2+\frac{1}{2}$ mol. $CH_3OH$: C, 67.5; H, 4.8. Found: C, 67.4; H, 4.7.

EXAMPLE 3

*Anhydro-3-ethyl-1'-hydroxythia-5'-(thiazolo[3,2-a]-quino)cyanine hydroxide*

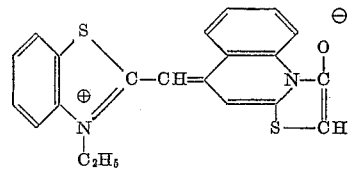

Anhydro-1-hydroxy-5-methylthiazolo[3,2-a]quinolinium hydroxide (1.08 g., 1 mol.), 2-ethylmercaptobenzothiazole ethoethylsulfate (1.75 g., 1 mol.), pyridine (15 ml.), and triethylamine (0.5 g., 1 mol.) were refluxed together for 15 minutes. After cooling, 100 ml. of methyl alcohol were added to the reaction mixture and the whole chilled. The solid was filtered off and washed with methyl alcohol. The crude dye was dissolved in pyridine and precipitated with methyl alcohol to give a 34% yield of dark crystals with a rose reflex, M. P. 225–226° C. dec.

*Anal.*—Calcd. for $C_{21}H_{16}N_2OS_2$: C, 67.0; H, 4.3. Found: C, 66.6; H, 4.5.

EXAMPLE 4

*Anhydro-1'-ethyl-1-hydroxy-5-(thiazolo[3,2-a]quino)-2'-cyanine hydroxide*

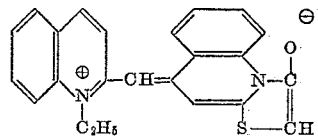

Anhydro-1-hydroxy-5-methylthiazolo[3,2-a]quinolinium hydroxide (1.08 g., 1 mol.), 2-phenylmercaptoquinoline etho-p-toluenesulfonate (2.2 g., 1 mol.), pyridine (15 ml.) and triethylamine (0.5 g., 1 mol.) were refluxed together for 10 minutes. After cooling, 100 ml. of methyl alcohol were added to the reaction mixture and the whole chilled. The solid was filtered off and washed with methyl alcohol. The crude dye was dissolved in pyridine and precipitated with methyl alcohol to give a 33% yield of dark lustrous crystals, M. P. 174–177° C. dec.

EXAMPLE 5

*Anhydro-1'-hydroxy-3-methyl-4,5-benzo-oxa-5'-(thiazolo-[3,2-a]quino)cyanine hydroxide*

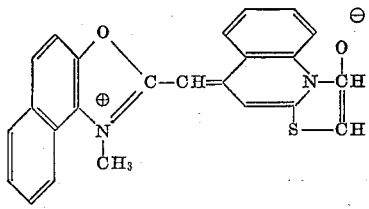

2-methylmercaptonaphtho[1,2]oxazole (1.08 g., 1 mol.) and methyl sulfate (0.63 g., 1 mol.) were heated together on the steam bath for two hours. The resulting quaternary salt, pyridine (20 ml.), anhydro-1-hydroxy-5-methylthiazolo[3,2-a]quinolinium hydroxide (1.08 g., 1 mol.) and triethylamine (0.5 g., 1 mol.) were refluxed together for 20 minutes. The reaction mixture was cooled and stirred with methyl alcohol. After cooling, filtering, and washing the residue with methyl alcohol, a 57 percent yield of crude dye was obtained. The dye was purified by dissolving it in hot pyridine and precipitating it with methyl alcohol. The pure dye was isolated as dark-green crystals in a 25 percent yield, M. P. 261–262° C. dec.

EXAMPLE 6

*Anhydro - 1' - hydroxy - 3 - methyl - 6,7 - benzo - oxa - 5' - (thiazolo[3,2-a]quino)cyanine hydroxide*

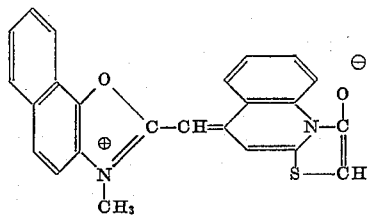

2-methylmercaptonaphtho[2,1]oxazole (1.08 g., 1 mol.) and methyl sulfate (0.63 g., 1 mol.) were heated together on the steam bath for two hours. The resulting quaternary salt, pyridine (20 ml.), anhydro-1-hydroxy-5-methylthiazolo[3,2-a]quinolinium hydroxide (1.08 g., 1 mol.) and triethylamine (0.5 g., 1 mol.) were refluxed together for 20 minutes. The reaction mixture was cooled and stirred with methyl alcohol. After cooling, filtering, and washing the residue with methyl alcohol, a 65 percent yield of crude dye was obtained. The dye was purified by dissolving it in hot pyridine and precipitating it with methyl alcohol. The pure dye was isolated as dark-brownish crystals in a 29 percent yield, M. P. 276–277° C. dec.

EXAMPLE 7

*Anhydro - 3 - ethyl - 1' - hydroxy - 6,7 - benzo - oxa - 5' - (thiazolo[3,2-a]quino)carbocyanine hydroxide*

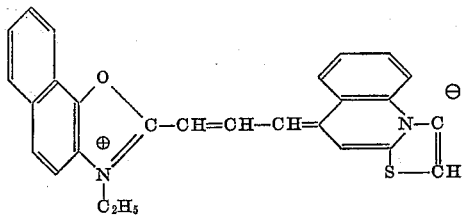

Anhydro - 1 - hydroxy - 5 - methylthiazolo[3,2-a]quinolinium hydroxide (1.08 g., 1 mol.), 2-β-acetanilidovinyl-3-ethylnaphtho[2,1]-oxazolium iodide (2.42 g., 1 mol.), pyridine (10 ml.) and triethylamine (0.5 g., 1 mol.) were refluxed together for 20 minutes. The reaction mixture was cooled and stirred with ether. After chilling, filtering, and washing the residue with methyl alcohol, a 55 percent yield of crude dye was obtained. The dye was purified by dissolving it in hot pyridine and precipitating it with methyl alcohol. The pure dye was isolated as dark crystals in a 29 percent yield, M. P. 205–207° C. dec.

EXAMPLE 8

*Anhydro - 3 - ethyl - 1' - hydroxy - 4,5 - benzothia -5' - (thiazolo[3,2-a]quino)carbocyanine hydroxide*

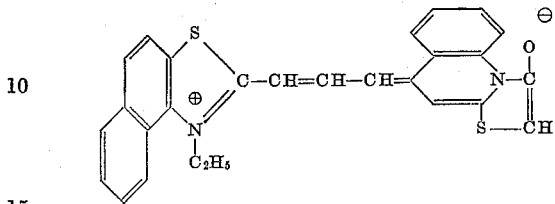

Anhydro - 1 hydroxy - 5 - methylthiazolo[3,2 - a]quinolinium hydroxide (1.08 g., 1 mol.), 2-β-acetanilidovinyl-1-ethylnaphtho[1,2]thiazolium p-toluenesulfonate (2.72 g., 1 mol.), pyridine (10 ml.), triethylamine (1.0 g.) and acetic anhydride (1.0 ml.) were refluxed together for 20 minutes. The reaction mixture was cooled and stirred with ether. After cooling, filtering, and washing the residue with methyl alcohol, a 73 percent yield of crude dye was obtained. The dye was purified by dissolving it in hot pyridine and precipitating it with methyl alcohol. The pure dye was isolated as very dark crystals in a 40 percent yield, M. P. 209–210° C. dec.

EXAMPLE 9

*Anhydro - 3 - ethyl - 1' - hydroxy - 9 - methyl - 4,5 - benzothia - 5' - (thiazolo[3,2 - a]quino)carbocyanine hydroxide*

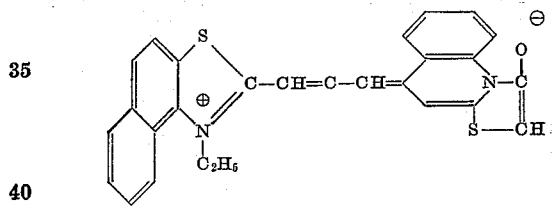

Potassium hydroxide (0.65 g., 85 percent KOH) was dissolved in ethyl alcohol (40 ml.) and after adding anhydro-1-hydroxy-5-methylthiazolo[3,2-a]quinolinium hydroxide (1.08 g., 1 mol.) and 1-ethyl-2-(2-ethylmercaptopropenyl)naphtho[1,2]thiazolium ethylsulfate (2.2 g., 1 mol.) the reaction mixture was refluxed for 15 minutes. After cooling, filtering, and washing the residue with methyl alcohol, a 74 percent yield of crude dye was obtained. The dye was purified by dissolving it in hot pyridine and precipitating it with methyl alcohol. The pure dye was isolated as very dark crystals in a 13 percent yield, M. P. 192–194° C. dec.

EXAMPLE 10

*Anhydro - 1' - hydroxy - 3 - methyl - 9 - phenyl - 4,5 - benzothia - 5' - (thiazolo[3,2 - a]quino)carbocyanine hydroxide*

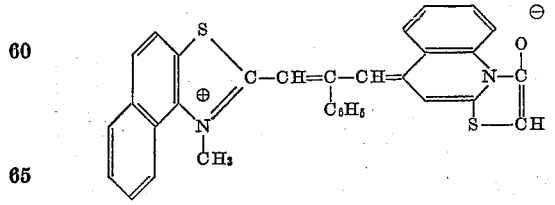

Potassium hydroxide (0.65 g., 85 percent KOH) was dissolved in ethyl alcohol (40 ml.) and after adding anhydro-1-hydroxy-5-methylthiazolo[3,2-a]quinolinium hydroxide (1.08 g., 1 mol.) and 1-methyl-2-(2-methylmercaptostyryl)naphtho[1,2]thiazolium p-toluenesulfonate (2.6 g., 1 mol.) the reaction mixture was refluxed for 15 minutes. After cooling, filtering, and washing the residue with methyl alcohol, a 64 percent yield of crude dye was obtained. The dye was purified by dissolving it in hot pyridine and precipitating it with methyl alcohol. The pure dye was isolated as very dark crystals in 7 percent yield, M. P. 223–224° C. dec.

EXAMPLE 11

*Anhydro - 5 - chloro - 3 - ethyl - 1' - hydroxythia - 5' - (thiazolo[3,2 - a]quino)carbocyanine hydroxide*

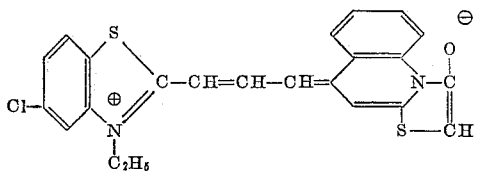

Anhydro - 1 - hydroxy - 5 - methylthiazolo[3,2 - a]-quinolinium hydroxide (1.08 g., 1 mol.), 2-β-acetanilidovinyl-5-chloro-3-ethylbenzothiazolium iodide (2.42 g., 1 mol.), pyridine (10 ml.) and triethylamine (0.5 g., 1 mol.) were refluxed together for 10 minutes. The reaction mixture was cooled, the crude dye was precipitated with ether, the ether layer was decanted, and the residue was stirred with methyl alcohol. After cooling, filtering, and washing the residue with methyl alcohol, a 78 percent yield of crude dye was obtained. The dye was purified by dissolving it in hot pyridine and precipitating it with methyl alcohol. The pure dye was isolated as very dark crystals in a 34 percent yield, M. P. 237–238° C. dec.

EXAMPLE 12

*Anhydro - 3 - ethyl - 1' - hydroxyselena - 5' - (thiazolo[3,2 - a]quino)carbocyanine hydroxide*

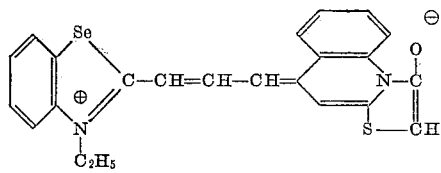

Anhydro - 1 - hydroxy - 5 - methylthiazolo[3,2 - a]-quinolinium hydroxide (1.08 g., 1 mol.), 2-β-acetanilidovinyl-3-ethylbenzoselenazolium iodide (2.5 g., 1 mol.), pyridine (10 ml.) and triethylamine (0.5 g., 1 mol.) were refluxed for 10 minutes. The reaction mixture was cooled, the crude dye was precipitated with ether, the ether layer was decanted and the residue was stirred with methyl alcohol. After cooling, filtering, and washing the residue with methyl alcohol, a 71 percent yield of crude dye was obtained. The dye was purified by dissolving it in hot pyridine and precipitating it with methyl alcohol. The pure dye was isolated as very dark crystals in a 38 percent yield, M. P. 180–182° C. dec.

The new dyes of our invention are useful in spectrally sensitizing photographic silver halide emulsions when incorporated therein. The dyes are especially useful for extending the spectral sensitivity of the customarily employed gelatino-silver-chloride, gelatino-silver-chlorobromide, gelatino-silver-bromide, gelatino-silver-bromiodide, and gelatino-silver-chlorobromiodide developing-out emulsions. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or sometimes acetone has proved satisfactory as a solvent for most of our new dyes. The dyes are advantageously incorporated in the finished, washed emulsions and should be uniformly distributed through the emulsions.

The concentration of the dyes in the emulsions can vary widely, e. g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in pyridine or acetone (or a mixture of acetone and pyridine) and a volume of this solution (which may, in some cases, be diluted with water) containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g., by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of our invention can also contain such addenda as chemical sensitizers (e. g., sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079), etc.), etc., or mixtures of such sensitizers, antifoggants (e. g., benzotriazole, nitrobenzimidazole, 5-nitroindazole, etc., (see Mees "The Theory of the Photographic Process," Macmillan Pub., pg. 460), or mixtures thereof), hardeners (e. g., formaldehyde (U. S. 1,763,533), chrome alum (U. S. 1,763,533), glyoxal (Ger. 538,713), dibromacrolein (Br. 406,750), etc.), color couplers, (e. g., such as those described in U. S. Patent 2,423,730, Spence and Carroll U. S. application 771,380, filed August 29, 1947, now U. S. Patent 2,640,776, etc.), or mixtures of such addenda. Dispersing agents for color couplers, such as substantially water-soluble, high boiling crystalloidal materials, such as those set forth in U. S. Patents 2,322,027 and 2,304,940 can also be employed in the above-described emulsions.

The new dyes of our invention as represented by Formula I above can alternatively be written in the form of their resonance isomer, viz., Ia.

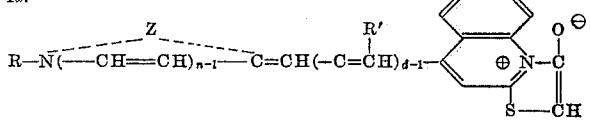

While our new dyes can be represented as uncharged structures, such as:

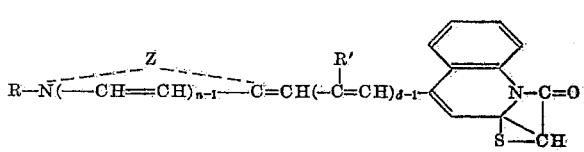

or

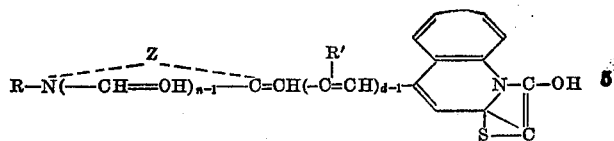

the instability of such structures is immediately apparent.

What we claim as our invention and desire secured by Letters Patent of the United States is:

1. A cyanine dye selected from those represented by the following general formula:

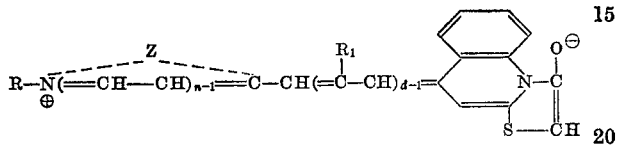

wherein R represents an alkyl group of the formula $C_mH_{2m+1}$ wherein $m$ represents a positive integer of from 1 to 4, $R_1$ represents a member selected from the group consisting of a hydrogen atom, an alkyl group containing from 1 to 4 carbon atoms, and a mononuclear aromatic group of the benzene series, $d$ and $n$ each represents a positive integer of from 1 to 2, and Z represents the non-metallic atoms necessary to complete a heterocyclic nucleus containing five atoms in the heterocyclic ring when $n$ is 1 and six atoms in the heterocyclic ring when $n$ is 2, said heterocyclic nucleus being selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the benzimidazole series, those of the 3,3-dialkylindolenine series, those of the 2-pyridine series, and those of the 4-pyridine series.

2. A cyanine dye selected from those represented by the following general formula:

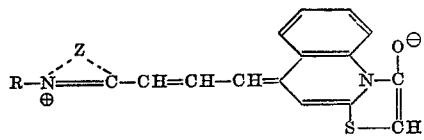

wherein R represents an alkyl group of the formula $C_mH_{2m+1}$ wherein $m$ represents a positive integer of from 1 to 4 and Z represents the non-metallic atoms necessary to complete a heterocyclic nucleus of the benzothiazole series.

3. A cyanine dye selected from those represented by the following general formula:

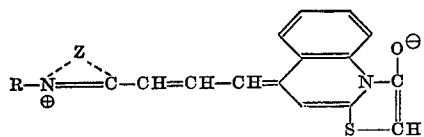

wherein R represents an alkyl group of the formula $C_mH_{2m+1}$ wherein $m$ represents a positive integer of from 1 to 4 and Z represents the non-metallic atoms necessary to complete a heterocyclic nucleus of the naphthathiazole series.

4. A cyanine dye selected from those represented by the following general formula:

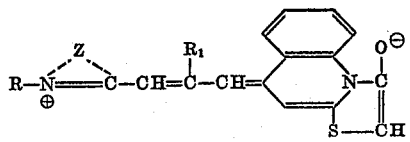

wherein R and $R_1$ each represents an alkyl group of the formula $C_mH_{2m+1}$ wherein $m$ represents a positive integer of from 1 to 4 and Z represents the non-metallic atoms necessary to complete a heterocyclic nucleus of the naphthathiazole series.

5. A cyanine dye selected from those represented by the following general formula:

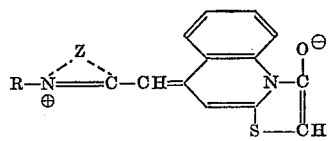

wherein R represents an alkyl group of the formula $C_mH_{2m+1}$ wherein $m$ represents a positive integer of from 1 to 4 and Z represents the non-metallic atoms necessary to complete a heterocyclic nucleus of the naphthoxazole series.

6. A cyanine dye selected from those represented by the following general formula:

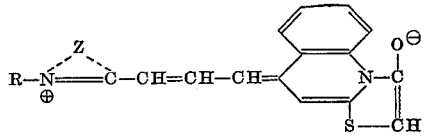

wherein R represents an alkyl group of the formula $C_mH_{2m+1}$ wherein $m$ represents a positive integer of from 1 to 4 and Z represents the non-metallic atoms necessary to complete a heterocyclic nucleus of the naphthoxazole series.

7. The cyanine dye represented by the following formula:

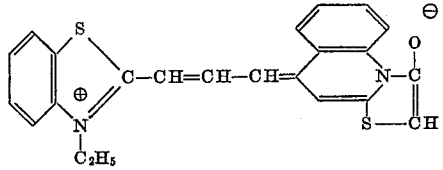

8. The cyanine dye represented by the following formula:

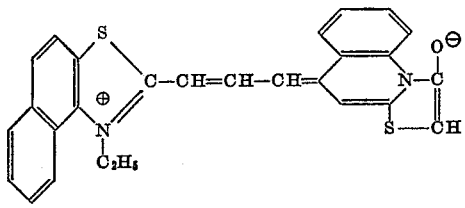

9. The cyanine dye represented by the following formula:

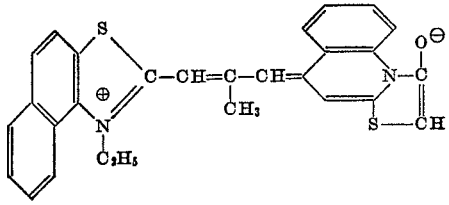

10. The cyanine dye represented by the following formula:
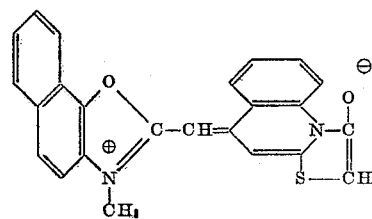
11. The cyanine dye represented by the following formula:
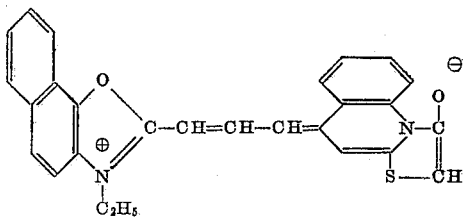
No references cited.